US008685481B2

(12) United States Patent
Dubbelman et al.

(10) Patent No.: US 8,685,481 B2
(45) Date of Patent: *Apr. 1, 2014

(54) UMAMI ACTIVE FRACTION AND METHOD TO PREPARE THE SAME

(75) Inventors: Sander Dubbelman, Vlaardingen (NL); Nikolaos Mavroudis, Vlaardingen (NL); Leandro Oliehoek, Valinhos (BR); Peter Ravestein, Vlaardingen (NL)

(73) Assignee: Conopco, Inc., Englewood Cliffs, NJ (US)

( * ) Notice: Subject to any disclaimer, the term of this patent is extended or adjusted under 35 U.S.C. 154(b) by 96 days.

This patent is subject to a terminal disclaimer.

(21) Appl. No.: 12/809,707

(22) PCT Filed: Dec. 19, 2008

(86) PCT No.: PCT/EP2008/068052
§ 371 (c)(1),
(2), (4) Date: Jun. 21, 2010

(87) PCT Pub. No.: WO2009/080763
PCT Pub. Date: Jul. 2, 2009

(65) Prior Publication Data
US 2010/0272878 A1     Oct. 28, 2010

(30) Foreign Application Priority Data

Dec. 21, 2007  (EP) .................................. 07124003
Dec. 21, 2007  (EP) .................................. 07124025

(51) Int. Cl.
*A23L 1/22* (2006.01)
*A23L 2/02* (2006.01)
*A23F 3/00* (2006.01)
*A23L 1/40* (2006.01)

(52) U.S. Cl.
USPC .............. 426/534; 426/489; 426/49; 426/589

(58) Field of Classification Search
None
See application file for complete search history.

(56) References Cited

U.S. PATENT DOCUMENTS

| | | | |
|---|---|---|---|
| 4,698,230 A |  | 10/1987 | Willard |
| 6,890,574 B1 * | | 5/2005 | Geifman et al. ............... 426/534 |
| 2006/0088646 A1 | | 4/2006 | Zelkha |
| 2010/0272877 A1 * | | 10/2010 | Dubbelman et al. ........... 426/565 |
| 2011/0305816 A1 * | | 12/2011 | Dubbelman et al. ........... 426/589 |

FOREIGN PATENT DOCUMENTS

| | | |
|---|---|---|
| EP | 1 082 027 | 3/2001 |
| EP | 1 082 027 B | 3/2001 |
| FR | 2041431 | 1/1971 |
| JP | 2003135038 A | 5/2003 |
| JP | 2003135038 A * | 5/2003 |
| WO | 95/16363 | 6/1995 |
| WO | 95/16363 A | 6/1995 |
| WO | WO9613178 | 5/1996 |
| WO | WO9748287 | 12/1997 |
| WO | WO9960868 | 12/1999 |
| WO | WO03024243 A2 | 3/2003 |
| WO | 03/101223 | 12/2003 |
| WO | 2005/082164 A | 9/2005 |
| WO | 2008/040611 A | 4/2008 |

OTHER PUBLICATIONS

Salles, C; Nicklaus, S.; Septier, C. Determination and gustatory properties of taste-active compounds in tomato juice. Food Chemistry, 81(2003): 395-402.*
Schlichtherie-Cerny, H.; Affolter, M.; Cerny, C. Taste-Active Glycoconjugates of Glutamate: New Umami Compounds in Challenges in Taste Chemistry and Biology; Hoffman T. et al. ed. ACS Symposium Series; American Chemical Society Washington DC 2003 : 210-222.*
*International Search Report*, PCT/EP2008/068052, mailed Sep. 15, 2009, 3 pp.
*European Search Report* (Partial), EP 07 12 4025, dated Jun. 2, 2008, 3 pp.
Pursuant to MPEP § 2001.6(b) applicants bring the following copending application to the Examiner's attention: Applicant: Dubbelman, et al. U.S. Appl. No. 12/809,697, filed Jun. 21, 2010, For: Tomato Product and Process to Preparethe Same.
Zohar Nir, et al., Jan. 1, 1993, Lycopene From Tomatoes, A New Commercial Natural Carotenoid, International Food Ingredients, xx xx, No. 6, pp. 45-51 (XP000564224).
Davies et al., Changes in the Individual Sugars of Tomato Fruit During Ripening, J Sci Fd Agric, 1975, 1103-1110, 26, Glasshouse Crops Research Institute, Rustington, Littlehampton.
De Bruyn et al., Variation in Taste and Chemical Composition of the tomato (Lycopersicon Esculentum Mill), Euphytica, 1971, 214-227, 20, Institute for Horticultural Plant Breeding (IVT), Wageningen.

* cited by examiner

*Primary Examiner* — Humera Sheikh
*Assistant Examiner* — Subbalakshmi Prakash
(74) *Attorney, Agent, or Firm* — Ellen Plotkin

(57) ABSTRACT

The present invention relates to an umami enhancing composition comprising at least one umami enhancing compound, said composition (a) being capable of passing an ultra filtration membrane having a molecular weight cut off of 250 kDa, (b) being substantially free from lycopene, (c) containing a compound of less than 250 kDa, and (d) capable of enhancing the umami taste. Umami active tomato fractions comprising these compositions are also claimed. Such fractions and compositions are suitable for preparing food products.

14 Claims, No Drawings

UMAMI ACTIVE FRACTION AND METHOD TO PREPARE THE SAME

FIELD OF THE INVENTION

The present invention relates to an active fraction for adding and/or enhancing umami taste and compositions comprising the same, for use in foods, and to methods of preparing such fractions and compositions.

BACKGROUND OF THE INVENTION

Monsodium glutamate also known as MSG, Ve-tsin or E621 is a frequently used ingredient to add umami taste in foods. Monosodium glutamate is the sodium salt of the amino acid glutamic acid. Originally it comes from the Far East, but nowadays it is used in many products. Monosodium glutamate is a controversial additive. Many people claim health problems after eating MSG, on the other hand clinical studies give no reason for concern.

The tongue is sensitive to five tastes—salt, sweet, bitter, sour, and "umami" in the Japanese language, the taste of glutamate. There is no analogous word to describe this taste quality in the English language. "Umami" is used by the Japanese to describe the taste of MSG as well as the meaty taste of certain fish and broth. It should be noted that although glutamate is often referred to as flavour enhancer, this probably incorrect as the umami taste is a taste on it's own. Therefore, the term flavour or taste enhancer will not be used to avoid confusion. Instead, the taste of glutamate will be described as umami taste.

Healthy eating is essential for maintaining a good quality of life, especially in an ageing population. MSG can improve food palatability and acceptance, increase salivary flow and immunity, and reduce oral complaints in both sick and healthy elderly.

Consumers continue to have questions regarding MSG's safety and efficacy. However, there is general agreement in the scientific community, based on numerous biochemical, toxicological and medical studies over the last twenty years, that MSG is safe for the general population, including pregnant and lactating women, and children. The "Chinese Restaurants syndrome" takes its name because it generally occurs after ingestion of Chinese foods. As responsible of this illness glutamate has always been indicated, because of its frequent use in Chinese cuisine and it was suggested that there might be idiosyncratic intolerance in some individuals. Symptoms include broncho-constriction in asthmatics. However, controlled double-blind crossover studies have failed to establish a relationship between Chinese Restaurant Syndrome and ingestion of MSG, even in individuals reportedly sensitive to Chinese meals and asthmatics.

After many years of scientific evaluations and meetings the Joint FAO/WHO Expert Committee on Food Additives (JECFA) decided in 1987 that monosodium glutamate was allocated with an "Advised Daily Intake (ADI) not specified". This indicates that no toxicological concerns arise associated with its use as a food. In 1991 the European Community's Scientific Committee for Food (SCF) confirmed the safety of MSG. A subsequent review by the Federation of American Societies for Experimental Biology (FASEB) and the federal Drug Administration (FDA) came to the same safety conclusions as the JEFCA.

Nevertheless, and despite the fact MSG is often required to be included among the list of food ingredients, many food manufacturers have increasingly adopted a strategy of placing additional prominent messages regarding MSG on food labels. As a result, food labels advertising "No added MSG" have become commonplace. One possible consequence of such labels is that they generate and reinforce beliefs that MSG is harmful and/or an unsafe ingredient. Recent research on the effects of different types of label information suggests the possibility that these messages may also influence the acceptability of products containing added MSG. A recent study examined the impact of information specifying the addition of MSG to foods or not. The attitudes towards MSG were evaluated and found to be generally negative.

Hence, whereas MSG or glutamate can actually aid to providing healthier eating habits, consumer acceptance is generally low, even despite the proved safety of MSG. There is thus a need for MSG based umami active compositions that constitute natural food ingredients and that can be mentioned on food product labels as such or do not have to be mentioned on the labels at all.

One such composition has been described in EP 1 082 027, which relates to a clear tomato concentrate comprising hydrolysed proteins, amongst other glutamate. The clear tomato concentrate of EP 1 082 027 is produced by processing tomatoes so as to obtain two fractions, the serum and the pulp, where after the serum is further concentrated to a value of e.g. 80 Brix and then hydrolyzed or vice versa. Both acid and enzymatic hydrolysis are suggested in EP 1 082 027. The obtained clear tomato concentrate may subsequently be dried on a variety of materials. Production of tomato serum as such has been described in a variety of prior art documents, such as WO 03/101223 and WO 95/16363.

The clear tomato concentrate obtainable by the method disclosed in EP 1 082 027 has several draw-backs. First of all, in spite of the fact that the tomato concentrate is described as clear, i.e. transparent or having low opacity, it is in fact red to dark red. It is noted that the serum in accordance with EP 1 082 027 has a lycopene level of about 5 ppm at a Brix value of 5, as described by WO 95/16363 to which EP 1 082 027 refers, such that after concentration to a Brix value of 60 or higher, the lycopene level must be 60 ppm or higher, thus giving a far more intense red colour than do fresh tomatoes, having a lycopene level of approximately 25, according to USDA. This problem becomes particularly evident when applying said concentrate at levels exceeding approximately 0.5%, thus greatly reducing the applicability thereof in a whole range of products wherein redness is undesirable, e.g. in white soups such as cream soups, bouillons, such a chicken bouillons and beverages. Secondly, it was found that following the teachings of EP 1 082 027, concentrates are obtained that still possess tomato taste/flavour as well as tomato smell and giving a specific sour taste. Thus, these products are in fact unsuitable for application in substantial amounts, i.e. in amounts exceeding approximately 0.5 wt %, in non-tomato based products. Thirdly, EP 1 082 027 mentions that it solves the problem of Chinese Restaurant Syndrome, which as described above is a non-existing syndrome.

To minimise the amount of MSG in food products it would be desirable to provide an umami active fraction for the use of enhancing the umami taste, preferably by at least two fold or even at least 3 fold. Therefore, one object of the invention is to provide for an umami active fraction for the use of enhancing the umami taste.

In addition, as explained above, there still exists a need to for a umami active tomato fraction comprising glutamate which can be used as a natural umami active fraction for adding a umami taste to a wide variety of food products, without adding an undesired off taste. Moreover, it would be desirable to provide for a more cost effective and robust process to produce such umami active tomato fraction.

SUMMARY OF THE INVENTION

Surprisingly, applicants have found an umami active fraction of a plant extract which can be used to enhance the umami taste. That is said umami active fraction when added to a composition containing a certain amount of MSG, will enhance the umami taste of that composition compared to a composition with an equivalent amount of MSG. In fact, the examples show an umami enhancing composition which 4 times more efficient than MSG. Thus, according to a first aspect of the invention an umami active fraction of a plant extract is provided for the use of enhancing the umami taste, the umami active fraction
a) being capable of passing an ultra filtration membrane having a molecular weight cut off of 250 kDa,
b) being substantially free from lycopene,
c) containing a compound of less than 250 kDa, and
d) capable of enhancing the umami taste. According to one preferred embodiment said umami active fraction is an umami tomato fraction.

Moreover, applicants have found a process to prepare an umami active tomato fraction which can be used to add and/or augment the umami taste in a wide variety of food applications without adding an undesired off taste. The problem with previous processes to prepare umami active tomato fractions is that these either do not deliver such a widely applicable fraction because of the distinctive tomato flavour and/or colour or are not sufficiently cost effective. Another problem is that many processes lack the robustness needed for large scale fractionation. Therefore, according to another aspect of the invention, a process is provided comprising a step of separating tomato serum in at least one portion low in lycopene and fractionating said portion by applying at least two consecutive fractionation steps. Other embodiments of the invention are described below.

DETAILED DESCRIPTION OF THE INVENTION

Definitions

The term "umami active" will be used to describe a composition which either has an umami taste or is able to enhance umami taste or both. The term "fraction' will be used to describe part of a plant extract obtainable after fractionation. The term "plant extract" will be used to describe the part of the plant from which insoluble matter such as skins, seeds has been removed. An example of a plant extract is tomato serum or a fruit juice.

The term tomato sugar(s) will be used to describe the combined amount of tomato glucose and fructose. Preferably these are measured as described in the examples. The term "tomato fraction" will be used to describe a fraction obtainable after a fractionation step using a tomato extract as a feed. The term "tomato extract" will be used to denote a composition extracted from tomatoes such as tomato serum. The term "primary tomato fraction" will be used to describe a tomato fraction obtained after one fractionation step. The term "secondary tomato fraction" will be used to describe a tomato fraction obtained after fractionating a primary tomato fraction. The term "tomato fraction" will be used to refer to a primary or a secondary tomato fraction or both. When the term "first" and "second" is used to distinguish e.g. a first primary fraction from a second primary fraction, these terms are meant to distinguish these primary fractions from each other and not meant to describe the order of elution of these fractions. In one preferred embodiment, the terms "first" "second" are meant to describe the order of elution. Although, the inventive tomato fraction will not have a characteristic tomato smell it usually will have trace amounts of some aroma and phenolic compounds that survive the process to obtain said tomato fraction such as the separation, fractionation steps. A tomato fraction will usually have amounts of GABA, proline and potassium. Preferably a tomato fraction will have at least 0.05 wt % of the combined amount of GABA and proline and preferably at least 0.1 wt % of potassium by dry weight of the tomato fraction. It is understood that when a combined amount is described it does not mean that all components need to be present. In the case of a "combined amount of GABA and proline" e.g. in some cases proline may be absent.

Some of the features are expressed as ratio's e.g. a fructose to glucose ratio. In a preferred embodiment, the level of fructose and glucose will be both 0. In that event the ratio will be considered to be 0. It will be appreciated by the skilled person that glutamic acid and glutamate refer to the protonated acid and the deprotonated solubilised form of the same acid respectively. In addition glutamate is commonly used to refer to salts of the free acid. For the sake of convenience the term glutamic acid is used herein to refer to both the free protonated acid and the deprotonated form either in solution or as a salt, unless indicated otherwise. Thus, to calculate the amount of glutamic acid in the tomato extract, all glutamate therein is assumed be in the form of glutamic acid.

The term "Brix value" which is considered to be synonymous to the term Degrees Brix (symbol °Bx) is a measurement of the amount of dry matter. It is a measure of the percent total soluble solids in a given weight of plant juice, which includes the summation of sucrose glucose, fructose, vitamins, amino acids, protein, hormones and any other soluble solids. It is often expressed as the percentage of sucrose. It is measured with a saccharimeter that measures specific gravity of a liquid or more easily with a refractometer or a Brix hydrometer.

The term "comprising" whenever used in this document is intended to indicate the presence of stated features, integers, steps, components, but not to preclude the presence or addition of one or more other features, integers, steps, components or groups thereof.

Typically the umami active tomato fraction is colourless, in particular devoid of the characteristic redness of tomatoes, to such a degree that it does not impart perceptible redness when applied in umami enhancing and/or taste enhancing quantities in a foodstuff or beverage, which means that it preferably has a b* value of less than 8 at a Brix level of 1, more preferably it has a b* value of less than 5 at said Brix value, more preferably a b* value of less than 2 at said Brix value and most preferably it has an b* value of less than 0.

As is known by the skilled person, L*, a*, and b* values are each spectral variables in the CIELAB colourspace (full name is CIE 1976 L*, a*, b*), expressing colour values in a rectangular coordinate system, with the L*, a*, and b* values each corresponding to one dimension of the three dimensions forming the rectangular coordinate system. The L* value characterizes the lightness/darkness aspect of the colour of the region along an axis ranging from black to white, with corresponding values ranging from 0 to 100. The a* value characterizes the colour of the region along an axis ranging from green to red, with positive values corresponding to red and negative values corresponding to green. The b* value characterizes the colour of the region along an axis ranging from blue to yellow, with positive values corresponding to yellow and negative values corresponding to blue. Together, the a* value and the b* value express the hue and chroma of the region. The zero point in the plane defined by the a* values and the b* values corresponds to a neutral grey colour having a L* value corresponding to the intersection of the plane with the L* axis. A CIELAB of 50, 75, 5, for example, is typical for red, while a CIELAB of 50, −75, 5 is typical for green. A yellow sample would perhaps have CIELAB of 70, 0, 80. Two samples that are the same color and change only in lightness would be, for example, 50, 50, 50 and 70, 50, 50. Suitable measuring devices include colorimeters and spectrophotometers as is known by the skilled person. References to colour reduction in the context of tomato extracts, are to be understood as meaning that, the visible colour, expressed in terms of L*, a*, and/or b*values, exhibited by the reduced colour tomato extract is reduced relative to the visible colour, expressed in terms of L*, a*, and/or b*values, exhibited by the starting material.

Umami Active Fraction

Unexpectedly, applicants have found an umami active fraction which is capable of enhancing umami taste of for example a food product. Therefore, according to a first aspect of the invention an umami enhancing composition is provided comprising at least one umami enhancing compound, said umami enhancing composition a) being capable of passing an ultra filtration membrane having a molecular weight cut off of 250 kDa,
b) being substantially free from lycopene,
c) containing a compound of less than 250 kDa, and
d) capable of enhancing the umami taste.

According to another aspect of the invention, an umami active fraction of a plant extract is provided for the use of enhancing the umami taste comprising the umami enhancing composition described above. Preferably said umami active fraction is characterized by a) being capable of passing an ultra filtration membrane having a molecular weight cut off of 250 kDa,
b) being substantially free from lycopene,
c) containing a compound of less than 250 kDa, and
d) capable of enhancing the umami taste.

The term "capable of enhancing the umami taste" or "able to enhance the umami taste" is meant to describe the capability of an umami active fraction (umami enhancing composition) to enhance umami taste itself, i.e., when added to a solution, the solution will have a higher umami taste perception than a comparable solution with an equivalent amount of glutamic acid but without the umami active fraction. Umami taste is routinely tested in the food industry. Preferably, it is tested by a trained panel, as described in the examples. The umami active fraction which is capable of enhancing umami taste preferably contains at least 1 wt % glutamic acid by dry weight of the umami active fraction.

Preferably, the umami enhancing composition or umami active fraction is capable of eluting from a cation exclusion resin in the potassium form at 65 degrees Celsius using demineralised water as eluent. Preferably, the umami active fraction or umami enhancing composition is capable of enhancing the umami taste by at least two fold or even at least 3 fold. For example an umami active fraction capable of enhancing the umami taste two fold when it is ranked at least equal in umami taste compared to a MSG reference solution comprising twice the amount glutamic acid, Such MSG reference solution may contain in addition to the desired amount of MSG, 0.5 wt % NaCl, an amount of acid and sugar equivalent to the amounts present in the umami enhancing composition or umami active fraction, respectively. Preferably, the MSG reference solution (see examples) comprises in addition to the desired amount of MSG, 0.5 wt % NaCl, 0.1 wt % fructose, 0.5 wt % glucose, 0.06 wt % of a mixture of citric acid and malic acid (10:1 w/w) in demineralised water. For an optimal resolving power, the umami enhancing composition may be diluted so it can be compared to MSG reference solutions used in the examples having 0.5, 1, 1.5 and 2 g/L glutamic acid. In addition, 0.5 wt % of NaCl may be added to the umami enhancing composition (diluted or not) for an optimal resolving power. Moreover, the pH of both the composition and reference solution may be adjusted to 5.4 for the tasting.

In a preferred embodiment, the umami active fraction is a tomato fraction, preferably substantially free from lycopene. An umami active tomato fraction substantially free from lycopene may be advantageously used in various food applications unlike tomato fractions with a characteristic tomato colour.

Although in one especially preferred embodiment, the umami enhancing composition or umami active fraction is a umami active tomato fraction, a person skilled in the art applying the teaching of this application may carry out the present invention without departing from it by using other plant extracts such as onions, carrots, peas and corn. Thus in more general embodiment, a method is provided of preparing an umami active fraction comprising the steps a) providing a plant extract;
b) separating the plant extract into two or more portions: at least one first portion and at least one second portion whereby the at least one first portion is lower in particles of at least 2 microns, than the at least one second portion (preferably the at least one first portion has particle size distribution as described below for the particle free tomato serum);
c) concentrating said first portion low in particles
d) fractionating at least one first portion obtained in step c) into at least one first primary fraction and at least one second primary fraction whereby glutamic acid in the at least one first primary fraction is lower than the at least one second primary fraction;
e) optionally, concentrating a primary fraction to be used as the feed for a second fractionation step; and
f) subjecting a primary fraction to a second fractionation step to prepare at least one first secondary fraction and at least one second secondary fraction whereby the level of glutamic acid of the at least one second secondary fraction is higher than the at least one first secondary fraction, and the umami active tomato fraction is, preferably formed by the at least one second secondary fraction. It is understood that particles in step b, include molecules and agglomerates of compounds.

Without wishing to be bound by theory, applicants believe that the umami-active fraction and more specifically the umami active tomato fraction is widely applicable as umami active fraction because certain ingredients are present in lower amount than in the original plant extract. Preferably these undesirable compounds are so low that the umami active fraction has i) at least 1 wt %, preferably at least 10 wt %, more preferably at least 15 wt % and preferably less than 70 wt %, more preferably less than 60 wt %, even more preferably less than 50 wt % of glutamic acid, all weights by dry weight of the tomato fraction;
ii) a w/w ratio of glucose to glutamic acid of less than 7, preferably less than 5, preferably less than 3, more preferably less than 1, more preferably more than 0.01;
iii) preferably a w/w ratio of citric acid to glutamic acid (C/Glu) of at most 0.7, preferably at most 0.5, preferably at most 0.3, preferably at most 0.2, more preferably at most 0.16, more preferably at most 0.05, more preferably at most 0.01, preferably at least 0.0001, most preferably 0.

In an even more preferred embodiment, the umami-active fraction and more specifically the umami active tomato fraction has a) less than 50 wt %, preferably less than 10 wt %, preferably less than 7 wt %, more preferably less than 5 wt % fructose, preferably more than 0.001 wt %, more preferably at least 0 wt % of fructose;

b) a w/w ratio of fructose to glucose of less than 1, preferably less than 0.75, more preferably less than 0.5, even more preferably less than 0.4, most preferably less than 0.2, preferably at least 0, more preferably at least 0.0001 and more preferably 0;

c) preferably at least 0.1 wt %, preferably at least 5 wt %, preferably at least 10 wt %, more preferably at least 15 wt % and preferably less than 70 wt %, more preferably less than 60 wt %, even more preferably less than 50 wt % of aspartic acid;

d) preferably more than 10 wt %, preferably more than 15 wt %, more preferably more than 20 wt % and preferably at most 90 wt %, more preferably at most 60 wt %, more preferably at most 50 wt %, more preferably at most 45 wt %, more preferably at most 40 wt % of glucose; based on the dry weight of the umami active tomato fraction.

The umami enhancing composition and (respectively umami active fraction) according to the invention may be advantageously used in a wide spectrum of food products. The amount of the inventive umami enhancing composition, (respectively umami active fraction) to be used in a food product is the sufficient amount to obtain the desired umami taste. According to another aspect of the invention a food product is provided comprising a sufficient amount of the inventive umami enhancing composition, (respectively umami active fraction), preferably a sufficient amount of the inventive umami enhancing composition, (respectively umami active fraction) is at least 0.01 wt %, more preferably at least 0.1 wt %, more preferably at least 1 wt %, preferably at least 5 wt %, more preferably at least 10 wt % and preferably at most 99 wt %, more preferably at most 90 wt %, most preferably at most 70 wt % based on the dry weight of the umami enhancing composition (respectively umami active fraction) and the food product. Although it is preferred to use the inventive umami active fraction instead of adding MSG, in some cases it may be combined. Especially preferred food products include tomato ketchup, sauces (e.g. tomato. pasta sauce), (salad) dressings, soups, meals, side dishes, cooking aids, beverages, and fruit and vegetable concentrates. Food products comprising the umami enhancing composition/umami active fraction typically have a higher umami taste perception when compared to the same food product comprising the equivalent concentration of glutamic acid in absence of the umami enhancing composition/umami active fraction.

Cooking aids include bouillon products in any format such a granular, pasty, jelly, compressed (e.g. in cubes with or without a semi solid core). Fruit and vegetable concentrates include those concentrates based on vegetables and/or fruits.

According a further aspect of the invention a method is provided for adding umami taste to a food product comprising the step of mixing the food product with an umami enhancing composition, respectively umami active fraction according to the invention, preferably in a sufficient amount as described above.

According to another aspect of the invention a method is provided to prepare a food product whereby at least part of the glutamic acid has been decreased comprising the step of replacing at least part of the glutamic acid by a sufficient amount of umami enhancing composition, respectively umami active fraction (according to the invention) while maintaining the same umami taste.

Since lowering the amount of glutamic acid may result in less MSG, and thus decreased amounts of sodium in the food product, according to yet another aspect of the invention a method is provided for lowering the amount of sodium in a food product containing MSG comprising the step of replacing at least part of the MSG by a sufficient amount of umami enhancing composition, respectively umami active fraction (according to the invention) while maintaining the same umami taste.

Process

When trying to develop a process to prepare the inventive umami active tomato fractions, applicants found that existing processes did not produce the desired w/w ratios, were not cost-effective or not robust, i.e. fractionation of different undesirable tomato compounds was not reproducible. Fractionation of tomato serum proved exceptionally difficult as many undesired ingredients ended up in the same fraction as the desired ingredients, thus creating fractions with complicated off tastes which were not widely applicable.

Therefore it was a further object of the invention to provide a process to solve these problems. Surprisingly, applicants have found that this object is met by the following aspect of the invention.

According to this aspect of the invention a method of producing an umami active tomato fraction is provided comprising the steps of a) providing a tomato serum, preferably substantially free from sucrose;

b) separating the serum into two or more portions: at least one first portion and at least one second portion whereby the at least one first portion is lower in lycopene than the at least one second portion;

c) concentrating the at least one first portion low in lycopene, preferably to a Brix value of at least 10, preferably at least 12, more preferably at least 20, more preferably at least 30 and preferably at most 80, more preferably at most 60, even more preferably at most 50 degrees Brix;

d) fractionating the concentrated at least one first portion obtained in step c) into at least one first primary fraction and at least one second primary fraction whereby the w/w ratio of citric acid to glutamic acid of the at least one first primary fraction is higher than the at least one second primary fraction, preferably the at least one second primary fraction has w/w ratio of citric acid to glutamic acid of at most 0.7, more preferably at most 0.5;

e) optionally, concentrating a primary fraction to be used as the feed for a second fractionation step, preferably to a Brix value of at least 10, preferably at least 12, more preferably at least 20, more preferably at least 30 and preferably at most 80, more preferably at most 60, even more preferably at most 50 degrees Brix;

f) subjecting a primary fraction, preferably the concentrated primary fraction of step e), to a second fractionation step to prepare at least one first secondary fraction and at least one second secondary fraction whereby the w/w ratio of citric acid to glutamic acid (C/Glu) of the second secondary fraction is lower than the at least one first secondary fraction. Preferably the umami active tomato fraction is formed by the at least one second secondary fraction. In some cases, at least one third secondary fraction is desirable.

Prior to providing the serum, tomatoes are typically collected, washed, sorted and selected in accordance with the usual practice in tomato processing. These steps are not an essential aspect of the invention and any feasible type of operation may be applied with regard to pre-treatment without departing from the scope of the invention.

Typically, the step of providing a tomato serum comprises a stage of comminuting and/or macerating tomatoes, which in accordance with the invention, is meant to encompass any type of process that can be employed to disintegrate or break the tomatoes, typically, in order to obtain a pumpable mass. Typically the comminuting or macerating is continued until the particle size in the pumpable mass is reduced to certain predetermined dimensions. In order to achieve this, any type of operation and/or apparatus known to or conceivable for the skilled person may be used in accordance with the invention. According to a preferred embodiment a chopper pump is employed, wherein the tomatoes are pressed through square holes, typically 1-2 cm in diameter. In a particularly preferred embodiment, the step of providing the serum comprises the stage of applying heat prior to, during or after the comminuting and/or macerating of the tomatoes. If the amount of heat applied is such that the tomatoes reach a temperature of above 80° C., the process is generally referred to as hot break. Hot break has the advantage that enzymes, e.g. pectin-degrading enzymes, are inactivated quickly.

The tomato serum used is preferably substantially free from sucrose. For this purpose the term substantially free from sucrose is meant to describe a level of less than 5 wt %, more preferably less than 3 wt %, most preferably less than 2 wt % of sucrose by weight of the tomato serum based on dry matter.

After having obtained a pumpable mass, in a separation step said pumpable mass is separated into serum—an aqueous liquid comprising soluble tomato solids—and pulp, a (wet) solid mass containing mainly insoluble tomato components such as the skin and seeds. In accordance with a preferred embodiment of the invention seeds and skin may be removed from the pumpable mass, typically by sieving using perforated screens or the like in accordance with common tomato processing, prior to said separation. Separation of the pumpable mass into serum and pulp can be effected by any means known in the art, in particular using a decanter or a centrifugal separator. In a particularly preferred embodiment of the invention a centrifugal separator is employed, such as a Westfalia CA-365-010 at a revolution speed of 4000 rpm and/or an Alfa Laval Centrifuge. In the context of the invention the pulp obtained is considered to constitute a waste material, but it may be used in accordance with conventional tomato processing, for a variety of purposes known by the skilled person. Performing the separation in two or even more steps may be preferred. However, as will be clear to the skilled person, separation in one single step, though less convenient, may be found just as suitable and may be applied without departing from the scope of the invention.

Optionally, the obtained serum may be clarified by micro filtration, so as to assure that said serum is free of any undissolved solids remaining, which may typically present problems during further process steps. Typically the additional micro filtration step comprises forcing the serum through a microfilter having a pore size within the range of 0.2-100 micron, preferably within the range of 2-50 micron, most preferably within the range of 3-30 micron (endpoints included in the range).

In a further step, the obtained serum, if desired after the micro-filtration step described supra, is separated into two or more portions: at least one first portion and at least one second portion whereby the at least one first portion is lower in lycopene than the at least one second portion. The first portion lower in lycopene, is preferably substantially free from lycopene as described below.

The serum used as starting material for this separation step is preferably undiluted or even more preferably concentrated. Concentration may be carried out until a specific predefined Brix level has been reached. For example, the solution may be concentrated by removing at least part of the water content e.g. under reduced pressure and/or increased temperature, such as to increase the rate of water evaporation. As will be understood by the skilled person, applying reduced pressure can suitably reduce thermal damage to the product as lower temperatures can be used, thus improving the quality of the obtained product. Preferably the concentration is performed using a falling film evaporator or plate evaporator, although entirely different systems are available and can be used without departing from the scope of the invention. Surprisingly, applicants have found that concentrating the solution used as the feed for the separation step or a fractionation step was especially advantageous by rendering the process more robust and cost effective. Thus, the feed for the separation step, the first fractionation step and the second fractionation step is preferably concentrated until having a Brix value of at least 10, preferably at least 12, more preferably at least 20, more preferably at least 30 and preferably at most 80, more preferably at most 60, even more preferably at most 50 degrees Brix.

The separation step preferably comprises ultra-filtrating the serum through a membrane with a molecular weight cut off of 250 kDa, more preferably 200 kDa, even more preferably 100 kDa, most preferably 50 kDa. For the ultra filtration any suitable membrane may be used known to the skilled person in the art for this purpose. Typically, ultra filtration membranes are meant to describe membranes which can remove particles of 0.001-0.02 micron. A suitable membrane is an Alfa-Laval polysulphone membrane with 100 kDa molecular weight cut-off (GR40PP). If ultra filtration is used, the at least one second portion is preferably the retentate of the ultra filtration step having a level of lycopene higher than the at least one first portion, the latter being the permeate. The at least one first portion of that separation step, e.g. the ultra filtration permeate is preferably substantially free from lycopene. In fact, all tomato fractions according to the invention are preferably substantially free from lycopene. Substantially free from lycopene in this respect means that the lycopene level is below 3 ppm, more preferably below 1 ppm, most preferably it is below 0.5 ppm, preferably at least 0 ppm, preferably 0 ppm. Ppm measurements are usually based on the wet weight thereof as it is measured in permeate which needs to be liquid for the next step of the process, but in some cases dry weight may be used.

In a preferred subsequent step, the at least one first portion obtained after the first separation step may then be concentrated as described above.

The at least one first portion obtained from the separation step, in case of ultra filtration the ultra filtration permeate, preferably after having been concentrated to e.g. 40 Brix, is then used as a feed for a chromatographic fractionation. This fractionation step is preferably carried out by passing the feed through the chromatographic separation medium and eluting the feed components from the medium with a suitable eluent, thereby achieving fractionation of the feed into at least one first primary fraction and at least one second primary fraction.

Any suitable method may be used for the fractionation step. Fractionation is preferably achieved by using ion exclusion chromatography whereby the chromatographic separation medium is an ion exclusion resin. Another fractionation technique includes electrodialysis.

Applicants have found that the fractionation is more robust and cost-effective when it is carried out at elevated temperatures. Fractionation, e.g. when ion exclusion chromatography is used, is preferably carried out at a temperature of at least 40 degrees C., preferably at least 50 degrees C., more preferably at least 60 degrees C., preferably at most 105 degrees C., preferably at most 95 degrees C., preferably at most 85 degrees C., most preferably at most 75 degrees C.

The at least one first portion obtained from the separation step used as a feed for the first fractionation step preferably comprises of more than 5 g/L of potassium, preferably more than 10 g/L of potassium, more preferably more than 15 g/L of potassium by weight of said first portion.

Any appropriate solution may be used as eluent but demineralised water is preferred. More preferred is water purified by for example reverse osmosis (e.g. MilliQ). Another preferred eluent includes demineralised water comprising at most 10 wt % (w/w), preferably at most 5 wt % or more preferably at most 2 wt %, more preferably at most 0.05 wt % or more preferably at most 0.01 wt % of particle free tomato serum. Preferably, the eluent comprises demineralised water and at least 0.001 wt of particle free tomato serum. Particle free tomato serum is usually meant to describe tomato serum comprising less than 5 ppm of particles of at least 0.2 microns, more preferably less than 3 ppm of particles of at least 0.2 microns, even more preferably less than 1 ppm of particles of at least 0.2 microns, most preferably no particles of at least 0.2 microns. In terms of particle size distribution, particle free tomato serum (or particle free eluent for that matters) is usually meant to describe tomato serum or eluent comprising at most 40 vol %, preferably at most 30 vol %, more preferably at most 20 vol % and preferably at least 0 vol % of particles of larger than 2 micron. Particle free tomato serum may be prepared using any suitable means known to the skilled person such as micro filtration, high speed centrifugation or ultra filtration.

Suitable ion exclusion resins include DIAION™ UBK-530, UBK-535, UBK-550, and UBK-555 (each of which is produced by Mitsubishi Chemical Corporation). Especially preferred is UBK-530, a strong acid cation exchange resin containing, as a base material, polystyrene-divinyl benzene gel (produced by MITSUBISHI CHEMICAL CORP.; K+-type; average particle size: 200 to 240 µm; exchange capacity: 1.6 meq/ml). The eluting solution is preferably demineralised water.

Another fractionation technique, especially for the first fractionation step, includes electrodialysis. Electrodialysis is an electro-membrane process where transport of ions takes place through ion exchange membranes from one solution to another under the influence of an electric potential. Ion-exchange membranes resemble highly swollen ion-exchange resins in a sheet format. In conventional electrodialysis two different kinds on ion-exchange membranes are used:

Cation exchange membranes which contain negatively charged groups fixed to the polymer matrix Anion exchange membrane which contain positively charged groups fixed to the polymer matrix Mobile ions in solution that have the same charge as the fixed groups in the membrane are referred as co-ions and mobile ions that have the opposite charge as the fixed groups in the membrane are referred as counter ions. In electrodialysis it is assumed that the total current through the membrane is transported by ions only. Under the influence of an electric field the mobile ions in solution travel to the respective electrodes. Co-ions are rejected by membranes and counter ions pass through the membranes. Generally guided by the teaching of this application, a skilled person will be able to choose the conditions and membranes for electro dialysis to obtain the inventive tomato fraction. More specifically, the membranes should preferably be permeable for negatively charged organic molecules having the molecular weight of 250, more preferably 225, more preferably 200. Most preferably, the membrane should be permeable for citric acid (192).

The primary fractions resulting from a first fractionation step may vary in composition depending on when they are collected. Preferably, first fractionation step comprises fractionating the concentrated at least one first portion relatively low in lycopene into at least one first primary fraction and at least one second primary fraction whereby the w/w ratio of citric acid to glutamic acid of the at least one first primary fraction is higher than the at least one second primary fraction, more preferably the at least one second primary fraction has w/w ratio of citric acid to glutamic acid of at most 0.7, more preferably at most 0.5;

According to one preferred embodiment, the at least one second primary fraction is used as the feed for the second fractionation step and has a potassium to glutamic acid ratio of less than 2, at most 1.5, preferably at most 1, more preferably at most 0.5.

A further step in the process according this aspect of the invention, comprises subjecting a primary fraction to a second fractionation step to prepare at least one first secondary fraction and at least one second secondary fraction whereby the w/w ratio of citric acid to glutamic acid (C/Glu) of the at least one second secondary fraction is lower than the at least one first secondary fraction.

The primary fraction used as a feed for the second fractionation step is preferably concentrated as described above. The primary fraction used as a feed for the second fractionation step is preferably the at least one second primary fraction.

The at least one second secondary fraction may be used as an umami active tomato fraction, preferably substantially free from lycopene obtainable by the method according to the invention. Said fraction comprises i) at least 1 wt %, preferably at least 10 wt %, more preferably at least 15 wt % and preferably less than 70 wt %, more preferably less than 60 wt %, even more preferably less than 50 wt % of glutamic acid, all weights by dry weight of the tomato fraction;

ii) a w/w ratio of glucose to glutamic acid of less than 7, preferably less than 5, preferably less than 3, more preferably less than 1, more preferably more than 0.01;

iii) preferably a w/w ratio of citric acid to glutamic acid (C/Glu) of at most 0.7, preferably at most 0.5, preferably at most 0.3, preferably at most 0.2, more preferably at most 0.16, more preferably at most 0.05, more preferably at most 0.01, preferably at least 0.0001, most preferably 0.

According to another preferred embodiment said umami active tomato fraction further comprises a) less than 50 wt %, preferably less than 10 wt %, preferably less than 7 wt %, more preferably less than 5 wt % fructose, preferably more than 0.001 wt %, more preferably at least 0 wt % of fructose;

b) a w/w ratio of fructose to glucose of less than 1, preferably less than 0.75, more preferably less than 0.5, even more preferably less than 0.4, most preferably less than 0.2, preferably at least 0, more preferably at least 0.0001 and more preferably 0;

c) preferably at least 0.1 wt %, preferably at least 5 wt %, preferably at least 10 wt %, more preferably at least 15 wt % and preferably less than 70 wt %, more preferably less than 60 wt %, even more preferably less than 50 wt % of aspartic acid;

d) preferably more than 10 wt %, preferably more than 15 wt %, more preferably more than 20 wt % and preferably at most 90 wt %, more preferably at most 60 wt %, more preferably at most 50 wt %, more preferably at most 45 wt %, more preferably at most 40 wt % of glucose; based on the dry weight of the umami active tomato fraction.

The examples show that the inventive method provides an umami active tomato fraction substantially free from lycopene having a higher umami taste perception when compared to a composition or solution comprising the equivalent concentration of glutamic acid.

For the second fractionation step, ion exclusion chromatography may be used as detailed above.

Any of these umami fractions may be concentrated as described above for the feed, or even dehydrated, preferably such that a dry powder is obtained. Any method known in the art may be used such as spray drying. An umami enhancing composition or umami active (tomato) fraction in the form of a dry powder can be used in dried concentrated products like soups and bouillons. Thus according to yet another embodiment of the invention, an umami enhancing composition or umami active (tomato) fraction is provided in the form of a dry powder.

Different embodiments of the invention may be carried out in using preferred or more preferred conditions (e.g. level of degrees Brix) or ingredients (e.g. levels of citric acid, glutamic acid). Preferred ranges will often be described in the following format: preferably at least x1, more preferably at least x2, even more preferably x3, preferably at most y1, more preferably at most y2, even more preferably at most y3, whereby x1<x2<x3<y3<y2<y1. This format is meant to include the preferred ranges x1 to y1, more preferably x2 to y2 and even more preferably x3 to y3 whereby the endpoints are included and also all subranges subsumed therein (e.g. x1 to y3 and x3 to y1). The same applies when ranges are described in the format "more than x1" or "less than y1" except that the endpoints are not included. Vice versa, when preferred ranges are described as x1 to y1, more preferably x2 to y2 and even more preferably x3 to y3, the endpoints are meant to be included and also all subranges subsumed therein (e.g. x1 to y3 and x3 to y1). In addition, all open ended ranges are meant to be included: preferably at least x1, more preferably at least x2, even more preferably x3, preferably at most y1, more preferably at most y2, even more preferably at most y3.

The invention is further illustrated by the following non-limiting examples. It will be clear to the skilled person how to carry out the invention by using equivalent means without departing from the invention.

EXAMPLES

Example 1

Tomatoes were washed and pressed through square holes resulting in an aqueous liquid comprising soluble tomato solids and pulp, a (wet) solid mass containing mainly insoluble tomato components called the fibers as well as seeds and skin. Sieves were used to remove seeds and skin and further separation of the fibers is achieved by using a decanter or a centrifugal separator, such as a Westfalia CA-365-010 at a revolution speed of 4000 rpm and/or an Alfa Laval Centrifuge.

The tomato serum was concentrated to 12.5 degrees Brix strength using a Mitchell pilot plant tray dryer with a dry bulb temperature of 65 degrees C. Then the concentrated tomato serum was separated into a first portion and a second portion whereby the first portion is relatively lower in lycopene than the second portion using ultra filtration. The separation was carried out by ultra filtering the tomato serum through an Alfa-Laval polysulphone membrane with 100 kDa molecular weight cut-off (GR40PP). The ultra filtration was performed in the plate and frame module of an M20 Alfa-Laval filtration rig at 50 C. degrees Celsius with a trans-membrane pressure of 2-3 bars and a recirculation flow rate of 12 L/min for the retentate stream. The permeate (first portion from the separation step) was substantially free from lycopene.

The permeate obtained after the ultra filtration step was then further concentrated by means of the same Mitchell tray dryer with a dry bulb temperature 65 degrees C. until reaching 40 degrees Brix strength. In the following step, the concentrated permeate was fractionated into a first primary fraction and a second primary fraction whereby the second primary fraction had a w/w ratio of citric acid to glutamic acid lower than the first primary fraction. For this fractionation step, the concentrated permeate was used as a feed in ion exclusion chromatography by passing the feed over a XK 2.6/100 GE healthcare column. The ion exclusion resin used was the DIAION UBK530 in its K+ form. The length of bed filled with the resin was measured to 95 cm and the diameter was 26 mm. The temperature of the column was kept at 65 degrees C. using a thermostat. The injection of feed and execution of the chromatography setup was achieved using an AKTA explorer 100 system from GE healthcare. A 5% Bed Volume (BV) of feed was injected followed by 2BV of elution, where demineralised water was the eluent. The cross flow velocity of the demineralised water was set to 0.95 cm/min.

The first 0.3BV of each injection was discarded and the remaining elution of the chromatography was collected at different BV intervals in a refrigerated environment in order to remain suitable for human consumption. At least one first primary tomato fraction and at least one second primary tomato fraction was collected. The fractions were analysed online for pH, electrical conductivity and refractive index. To obtain enough material, a number of injections were made sequentially and the respective fractions were pooled. One second primary fraction collected between 0.43-0.66 bed volume interval was concentrated to 20 degrees Brix using the Mitchell tray dryer as described above.

The concentrated second primary fraction was then used as the feed for a second fractionation step using the same chromatography parameters as for the first fractionation step. The primary fraction was fractionated into at least one first secondary tomato fraction and at least one second secondary tomato fraction.

Glucose, fructose and citric acid were determined by HPLC, using Aminex HPX-87H column, 300×7.8 mm and 5 mM sulphuric acid, pH=2 as eluent, flow rate 0.6 ml/min, at 65° C. Detection was carried out using UV (220 nm) and refractive index detector. This method may slightly overestimate the amount of glucose and fructose as the trace amount of sucrose in the tomato fraction is inverted to glucose and fructose. For the present purpose this is ignored and the values of glucose and fructose have not been corrected. The glutamic acid and aspartic acid were determined by AccQTag HPLC method of Waters Cooperation USA. The composition of a secondary fraction collected between 0.54-0.65 bed volumes is shown below Umami Active Tomato Fraction A.

| Ratio | Umami Active Tomato fraction A |
|---|---|
| w/w ratio of Citric Acid to Glutamic acid | 0.16 |
| w/w ratio of Glucose to Glutamic acid | 2.0 |

Assessment of the Umami Taste of the Umami Active Fraction Using a Trained Sensory Panel To identify the impact on flavour of the umami active fraction obtained, sensory evaluations have been performed by a trained sensory panel. This panel consisted of 14 panellists, selected from a group of over 100 panellists on the basis of screening tests for their ability to identify basic tastes and familiar odours, recognition of odours and tastes and verbal creativity. The panel was trained intensively on differentiating intensities of umami taste.

Assessment of MSG Standards Solutions

The sensitivity of the sensory panel was evaluated by offering the panel several reference MSG solutions with different levels of MSG (0.5, 0.75, 1 and 2 g/L). The reference solutions also contained amounts of sugars, salt and organic acids present in tomato fractions. For tomato organic acids a mixture of citric acid and malic acid was used (in a w/w ratio of 10:1). The exact compositions of the standard MSG solutions used are shown to the table below.

TABLE

MSG standard solutions used in the sensory panel.

| Ingredient | REF 1 0.5 g/l MSG wt % | REF 2 0.75 g/l MSG wt % | REF 3 1.0 g/l MSG wt % | REF 4 2 g/l MSG wt % |
|---|---|---|---|---|
| Salt | 0.50 | 0.50 | 0.50 | 0.50 |
| MSG | 0.05 | 0.075 | 0.10 | 0.20 |
| Tomato organic acids | 0.06 | 0.06 | 0.06 | 0.06 |
| Fructose | 0.10 | 0.10 | 0.10 | 0.10 |
| Glucose | 0.50 | 0.50 | 0.50 | 0.50 |
| Demi water | 98.8 | 98.8 | 98.7 | 98.6 |
| Total | 100.0 | 100.0 | 100 | 100.0 |

The four salt-water solutions were compared to each other in a ranking test. The ranking test is frequently used in sensory analyses and is a very sensitive test in which products are directly compared to each other on an attribute of interest (Lee, H. -S., van Hout, D., & O'Mahony, M. (2007). Sensory difference tests for margarine: A comparison of R-Indices derived from ranking and A-Not A methods considering response bias and cognitive strategies, Food Quality and Preference, 18, 675-680.). The assessment was conducted in triplicates and the panel ranked these 4 products on the attribute umami-taste and accurately perceived a significant difference ($p<0.05$) between the products. The results showed that the panel was able to differentiate between all 4 reference MSG solutions and to rank these correctly from low to high umami taste corresponding to the amount of MSG.

Assessment of Umami Taste and Enhancement of Umami Taste of the Umami Active Fraction The same sensory panel was used for assessment of the Umami efficiency of the diluted tomato fractions by ranking the umami taste thereof to reference MSG solutions comprising 0.5, 1.0, 1.5 and 2.0 g/L MSG respectively. The diluted tomato fractions I and II were prepared by diluting an umami active tomato fraction as prepared according to example 1 with water such that the resulting glutamic acid level corresponded to 0.5 and 0.75 g/L MSG respectively. 0.5 wt % NaCl was also added to the diluted tomato fractions. With such NACl concentration in the background, it is easier to differentiate different levels of umami taste. The composition is given in the table below. Both the diluted tomato fraction and the MSG reference solutions were set to pH 5.4 using small addition of NaOH.

TABLE

Diluted tomato fractions.

| Ingredient | Diluted tomato fraction I Salt + Tomato extract at level of 0.5 g/l MSG wt % | Diluted tomato fraction II Salt + Tomato extract at level of 0.75 g/l MSG wt % |
|---|---|---|
| Salt | 0.50 | 0.50 |
| Tomato extract | 15.9 | 23.8 |
| Demi water | 84.1 | 76.2 |
| Total | 100 | 100 |

The assessment conducted in triplicates, 42 ranking results were obtained and the results were also statistically analyzed. Surprisingly, the trained panel ranked the diluted tomato fraction with an equivalent of 0.5 g/l MSG in the same group as the 2 g/L MSG standard solution while the diluted tomato fraction with an equivalent of 0.75 g/l MSG had an umami-taste score higher than the 2 g/l MSG solution. This demonstrated that the taste enhancing tomato fraction was capable of enhancing the umami taste four fold.

Example 2

An Umami Active Tomato fraction B was prepared using a method similar to Example 1.

| Ratio | Umami Active Tomato fraction B |
|---|---|
| w/w ratio of Citric Acid to Glutamic acid | 0.35 |
| w/w ratio of Glucose to Glutamic acid | 4.8 |
| w/w ratio of Fructose to Glucose | 0.51 |
| Fructose (wt % based on dry matter) | 21.5 |

Example 3

A Umami Active Tomato fraction C was prepared using a method similar to Example 1.

| Ratio | Umami Active Tomato fraction C |
|---|---|
| w/w ratio of Citric Acid to Glutamic acid | 0.15 |
| w/w ratio of Glucose to Glutamic acid | 4.9 |
| w/w ratio of Fructose to Glucose | 0.47 |
| Fructose (wt % based on dry matter) | 21.9 |

A Dehydrated Potato Soup Composition Comprising an Umami Active Tomato Fraction According to the Invention. (to be Diluted by about 10 Times with Water Before Consumption).

| Ingredient | Wt % |
| --- | --- |
| Fat | 21.5 |
| Potato flakes | 21.5 |
| Thickener | 23.2 |
| Creme fraiche | 13.0 |
| Salt | 5.9 |
| Umami active tomato fraction (dehyderated) | 3.4 |
| Flavouring | 0.2 |
| IMP + GMP | 0.3 |
| Pepper | 0.0 |
| Palm oil | 3.5 |
| Herbs and spices | 3.4 |
| Vegetables | balance |
| Total | 100.0 |

A Chicken Bouillon Composition Comprising an Umami Active Tomato Fraction According to the Invention.

| Ingredient | Wt % |
| --- | --- |
| Palm fat | 6.00 |
| Sugar | 12.50 |
| Chicken flavour | 9.40 |
| Yeast extract | 2.50 |
| Colourant | 0.10 |
| Acidifier | 0.30 |
| Onion | 0.70 |
| IMP + GMP | 0.50 |
| Umami active tomato fraction (dehydrated) | 28.00 |
| Salt | balance |
| Total | 100.00 |

A White Asparagus Creamy Soup 500 ml white asparagus creamy soup is prepared from 54 g of dehydrated asparagus creamy soup without added MSG. About 80 g of an umami active tomato fraction is added such that the end concentration of glutamic acid is about 0.5 g/L.

The invention claimed is:

1. A plant-derived umami enhancing composition comprising at least one umami enhancing compound, said umami enhancing composition:
   a) containing at least 10 wt. % and less than 50 wt. % of glutamic acid, by dry weight of the composition;
   b) containing at least 5 wt. % and less than 50 wt. % of aspartic acid by dry weight of the composition;
   c) being substantially free from lycopene;
   d) having a w/w ratio of glucose to glutamic acid of less than 7, and more than 0.01; and
   e) having a w/w ratio of citric acid to glutamic acid of 0 to 0.7; and
   wherein said composition passes through an ultrafiltration membrane having a molecular weight cut off of 250 kDa.

2. A umami active fraction of a plant extract comprising the umami enhancing composition according to claim 1.

3. A umami active fraction according to claim 2 wherein the umami active fraction is a umami active tomato fraction; and the fraction elutes from a cation exclusion resin in the potassium form at 65 degrees Celsius using demineralized water as eluent.

4. A method for preparing a umami active fraction according to claim 2 comprising the steps:
   a) providing a plant extract;
   b) separating the plant extract into at least one first portion and at least one second portion;
   whereby said first portion is lower in particle concentration as vol. % of at least 2 microns than said second portion;
   c) concentrating said first portion;
   d) fractionating said first portion obtained in step c) into at least one first primary fraction and at least one second primary fraction whereby glutamic acid in the at least one first primary fraction is lower than the at least one second primary fraction;
   e) optionally, concentrating a primary fraction to be used as feed for a second fractionation step; and
   f) subjecting a primary fraction to a second fractionation step to prepare at least one first secondary fraction and at least one second secondary fraction whereby the level of glutamic acid of the at least one second secondary fraction is higher than the at least one first secondary fraction.

5. A method for producing an umami active tomato fraction containing 1-50 wt % of glutamic acid, by dry weight of the composition; having a glucose to glutamic acid ratio (w/w) of less than 0.6 and more than 0.01; and a ratio of citric acid to glutamic acid (w/w) of 0 to 0.7, said method comprising the steps of:
   a) providing a tomato serum, which contains less than 5 wt % of sucrose by weight of the tomato serum based on dry matter;
   b) separating the serum into at least one first portion by ultra-filtrating the serum through a membrane with a molecular cut off of not more than 250 kDa: and at least one second portion whereby the at least one first portion is lower in lycopene than the at least one second portion;
   c) concentrating the at least one first portion low in lycopene;
   d) fractionating at least one first portion obtained in step c) using ion exclusion chromatography into at least one first primary fraction and at least one second primary fraction whereby the w/w ratio of citric acid to glutamic acid of the at least one first primary fraction is higher than the at least one second primary fraction;
   e) optionally, concentrating a primary fraction to be used as the feed for a second fractionation step;
   f) subjecting a primary fraction to a second fractionation step to prepare at least one first secondary fraction and at least one second secondary fraction whereby the w/w ratio of citric acid to glutamic acid of the at least one second secondary fraction is lower than the at least one first secondary fraction.

6. A method according to claim 4 whereby the at least one second primary fraction used as the feed for the second fractionation step has a potassium to glutamic acid ratio of less than 2.

7. A method according to claim 4 whereby at least the second fractionation step is carried out at a temperature of at least 40 degrees Celsius.

8. A umami active tomato fraction substantially free from lycopene whereby said umami active tomato fraction comprises:
   i) at least 1 wt. %, and less than 70 wt. % of glutamic acid, all weights by dry weight of the tomato fraction;
   ii) less than 50 wt. % and more than 0.001 wt. % of fructose, based on the dry weight of the umami active tomato fraction;
   iii) more than 10 wt. %, and at most 90 wt. %, glucose; based on the dry weight of the umami active tomato fraction;
   iv) a w/w ratio of glucose to glutamic acid of less than 7, and more than 0.01;
   v) a w/w ratio of fructose to glucose of less than 0.75; and vi) a w/w ratio of citric acid to glutamic acid of at most 0.7, and at least 0.0001;
and whereby said umami active tomato fraction passes through an ultrafiltration membrane having a molecular weight cut off of 250 kDa.

9. A umami active tomato fraction according to claim 8 said umami active tomato fraction further comprising less than 50 wt. % of aspartic acid.

10. A umami active tomato fraction substantially free from lycopene according to claim 8, said umami active tomato fraction having a higher umami taste perception when compared to a composition comprising an equivalent concentration of glutamic acid.

11. A umami active fraction of a plant extract according to claim 2 in the form of a dry powder.

12. A food product comprising a sufficient amount of the umami active fraction of a plant extract according to claim 2, whereby the food product is selected from the group consisting of tomato ketchup, sauces, soups, meals, side dishes, cooking aids, beverages, ice cream and fruit and vegetable concentrates, said food product having a higher umami taste perception when compared to the same food product comprising the an equivalent concentration of glutamic acid in absence of the umami active fraction.

13. A method to prepare a food product whereby at least part of the glutamic acid content has been decreased, comprising the step of replacing at least part of the glutamic acid by a sufficient amount of a umami enhancing composition according to claim 1.

14. A method for lowering the amount of sodium in a food product containing monosodium glutamate (MSG) comprising the step of replacing at least part of the MSG by a sufficient amount of a umami enhancing composition according to claim 1.

* * * * *